Jan. 26, 1937.                W. H. SAID                2,068,819
SHIPPING CRATE
Filed Jan. 10, 1936
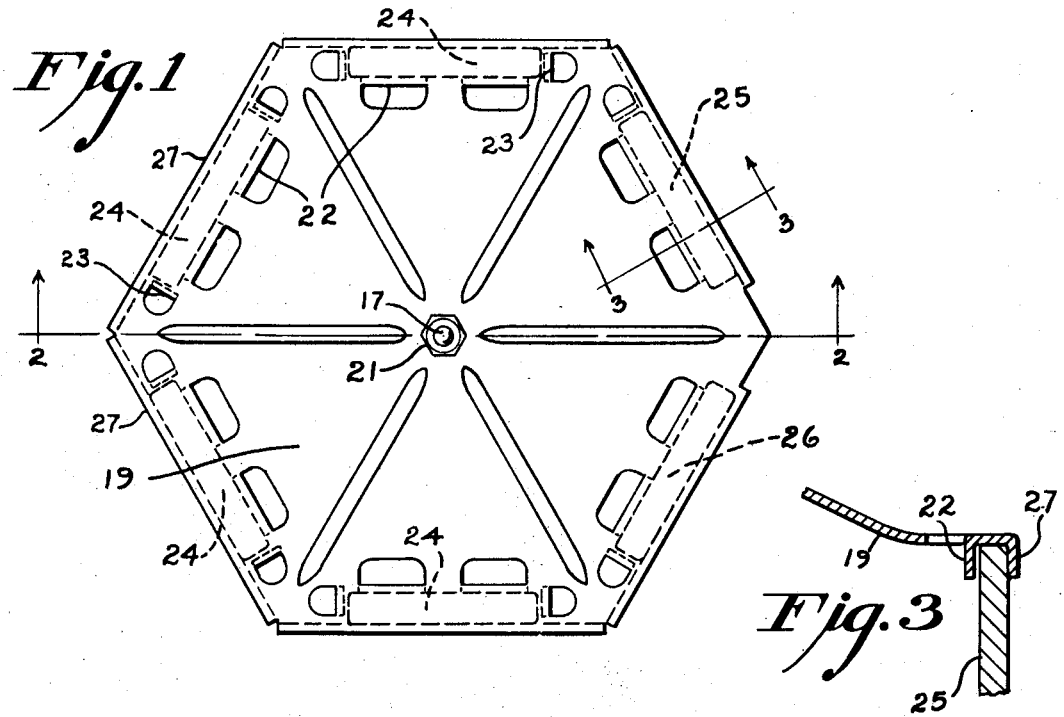
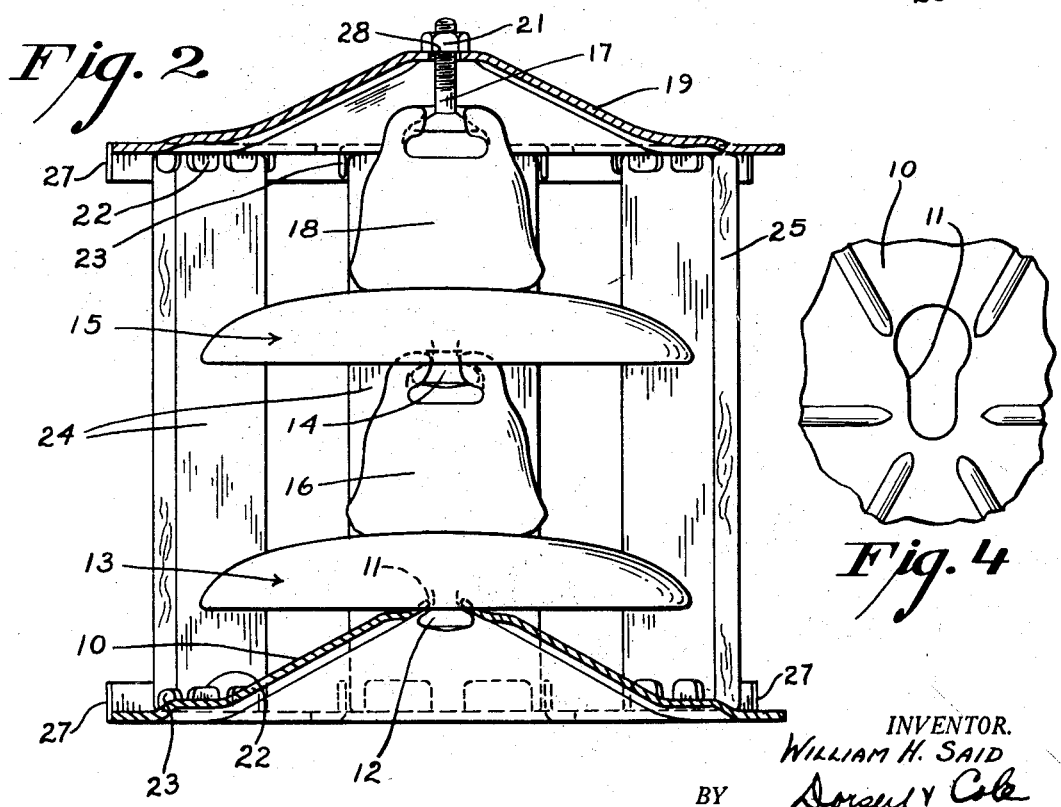
INVENTOR.
WILLIAM H. SAID
BY Dorsey y Cole
ATTORNEYS.

Patented Jan. 26, 1937

2,068,819

UNITED STATES PATENT OFFICE 2,068,819

SHIPPING CRATE

William Howard Said, Corning, N. Y., assignor to Corning Glass Works, Corning, N. Y., a corporation of New York Application January 10, 1936, Serial No. 58,589

7 Claims. (Cl. 217—52)

This invention relates to a new and improved device for the shipping of fragile articles such as insulators.

Heretofore considerable time and expense has been involved in preparing insulators for shipment to insure them against breakage, scratches and other injuries which may result through lack of rigidity or through frictional contact with one another.

The purpose of my invention is to facilitate the packing of insulators for shipment and to reduce to a minimum the cost of crating.

Another object is to hold the insulators in a rigid position and out of contact with the container during shipment.

Still a further object is to facilitate the transportation of such shipping containers when empty.

Among its features my invention embodies a shipping container which may be readily assembled or disassembled, and the employment of the article to be shipped as a tie by which the parts of the container are held together in assembled position during shipment.

In the drawing:

Fig. 1 is a top plan view of my invention;

Fig. 2 is a vertical sectional view taken on the line 2—2 of Fig. 1;

Fig. 3 is a fragmentary section at line 3—3 of Fig. 1; and

Fig. 4 is a plan view of the center portion of bottom plate 10 shown in Fig. 2.

Referring to the drawing in detail, a bottom plate 10, preferably constructed of sheet metal, is provided with a key-hole slot 11, as shown in Fig. 4, to receive a pin 12 of an insulator 13. A pin 14 which is a component part of an insulator 15, interlocks in the usual manner with a cap 16. Likewise a bolt 17, the head of which is of approximately the same dimensions as the lower portion of insulator pins 12 and 14, is received by a cap 18 of the insulator 15.

A series of slats 24, 25 and 26, comprising the sides of the container, are held in spaced relation to each other by a plurality of guides 22, stops 23 and flanges 27. A cover plate 19, of geometrical configuration similar to that of the bottom plate 10, is provided at its center with a substantially circular opening 28 through which the bolt 17 protrudes.

A nut 21, threaded on the bolt 17, is caused to bear against the cover plate 19, thus compressing the slats 24, 25 and 26 and simultaneously producing tension in the column of insulators connected to the end plates 10 and 19.

The guides 22 and the stops 23 are preferably formed by punching, while the outer edge of the metal plates may be bent at a right angle to form the flanges 27 which cooperate with the guides 22 in forming guide channels of suitable proportions to accommodate the ends of the slats.

By examination of the drawing and particularly Fig. 1, it will be observed that slats 25 and 26 are free to move in one direction while slats 24 are held against movement in all directions.

In assembling my shipping container for service, the slats 24 are first to be placed in their respective guide channels as shown in Fig. 1 between the cover plate 19 and the bottom plate 10. The insulator 13 is then placed in position by inserting its pin 12 in the key-hole slot 11 of the bottom plate 10 and moved in a direction to engage the narrowed portion thereof. In this position the insulator 13 will be substantially central in relation to the sides of the crate.

The insulator 15 is then secured to the insulator 13 in a similar manner to that shown in attaching insulator 13 to the bottom plate 10 (Fig. 2). The bolt 17 inserted in the cap 18 of insulator 15 is extended upwardly through the opening 28 of the cover plate 19, and the nut 21 is then screwed down sufficiently to lightly contact the cover plate 19. Slats 25 and 26 are then slipped into position against the stops 23, after which further tightening of the nut 21 completes the assembly, resulting in a compact unit capable of withstanding very severe shocks without danger of injury to the articles contained therein.

Although in the present instance I have shown and described my shipping container as conveniently housing two insulators, it will be readily seen that any desirable number of insulators may be packed for shipment in this manner merely by shortening or lengthening the slats. Further, it is to be understood that I do not wish to limit my invention to the particular geometrical construction shown and that minor changes of detail may be resorted to without departing from the spirit and scope of my invention as claimed.

I claim:

1. A knockdown shipping container comprising a pair of end plates, slats adapted to extend between the end plates to hold the latter in spaced parallel relation and protect an article confined between the end plates from injury, means connecting one end of the article to one of the end plates and adjustable means connecting the other end of the article to the opposite end plate to effect the holding of the article, the end plates and the slats rigidly with respect to each other.

2. In combination a shipping crate for insulators comprising a pair of end plates, an insulator between the end plates, slats separating the end plates, means for anchoring one end of the insulator to one end plate and adjustable means connecting the opposite end of the insulator to the opposite end plate to effect the holding of the insulator, the end plates and the slats rigidly with respect to each other.

3. In combination a shipping crate for insulators comprising a pair of end plates, an insulator between the end plates, slats separating the end plates, means for anchoring one end of the insulator to one end plate, adjustable means connecting the opposite end of the insulator to the opposite end plate and means on the end plates for holding the slats against outward movement.

4. In combination a shipping crate for insulators comprising a pair of end plates, an insulator between the end plates, slats separating the end plates, means for anchoring one end of the insulator to one end plate, adjustable means connecting the opposite end of the insulator to the opposite end plate, means on the end plates for holding the slats against outward movement and means on the end plates for holding the slats out of contact with the insulator.

5. In combination a shipping crate for insulators comprising a cover plate, a bottom plate, an insulator connected to the bottom plate, slats separating the cover plate from the bottom plate and means connected to the insulator and extending through the cover plate for producing tension on the insulator and compression on the slats.

6. In a shipping crate assembly for insulators of the type wherein a pin in the bottom of one insulator is adapted for interlocking with a cap of a similar insulator, a bottom plate adapted to be interlocked with the pin of the lowermost of a plurality of interlocked insulators, a cover plate and a series of spacing slats arranged between it and said bottom plate, and means interlocked with the cap of the uppermost of such insulators cooperative with said cover and bottom plates and with the insulators respectively to hold the insulators and the respective parts of the crate rigid with respect to each other.

7. In combination, a shipping crate for a plurality of interlocked insulators arranged one upon the other, including an end plate to which the lowermost of the insulators is anchored, a second end plate and a plurality of slats cooperative with it and with the first end plate to definitely space them with respect to each other and the insulators, and means extending between the uppermost of the insulators and the second end plate adjustable to hold the respective parts of the crate and the insulators rigid with respect to each other.

WILLIAM HOWARD SAID.